(12) United States Patent
Onoda

(10) Patent No.: US 8,852,774 B2  
(45) Date of Patent: Oct. 7, 2014

(54) METHOD OF BATTERY PRODUCTION

(71) Applicant: Yusuke Onoda, Toyota (JP)

(72) Inventor: Yusuke Onoda, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 13/691,932

(22) Filed: Dec. 3, 2012

(65) Prior Publication Data

US 2013/0139379 A1 Jun. 6, 2013

(30) Foreign Application Priority Data

Dec. 6, 2011 (JP) ................................. 2011-267093

(51) Int. Cl.
| | |
|---|---|
| *H01M 4/00* | (2006.01) |
| *H01M 10/04* | (2006.01) |
| *H01M 4/04* | (2006.01) |
| *H01M 10/0587* | (2010.01) |
| *H01M 10/052* | (2010.01) |

(52) U.S. Cl.  
CPC .......... *H01M 4/043* (2013.01); *H01M 10/0587* (2013.01); *H01M 10/052* (2013.01); *H01M 10/0431* (2013.01); *Y02E 60/12* (2013.01)  
USPC .............. 429/94; 429/66; 429/129; 429/133; 429/135; 429/164; 429/186

(58) Field of Classification Search  
CPC .............. Y02E 60/12; H01M 10/0413; H01M 10/5032; H01M 10/0409  
USPC .............. 429/66, 94, 129, 133, 135, 164, 186  
See application file for complete search history.

(56) References Cited

FOREIGN PATENT DOCUMENTS

| JP | 2003-157888 | | 5/2003 | |
|---|---|---|---|---|
| JP | 2003157888 A | * | 5/2003 | ............ H01M 10/04 |
| JP | 2010-198987 | | 9/2010 | |

* cited by examiner

*Primary Examiner* — Patrick Ryan  
*Assistant Examiner* — Ben Lewis  
(74) *Attorney, Agent, or Firm* — Finnegan, Henderson, Farabow, Garrett & Dunner, LLP

(57) ABSTRACT

A battery production method according to the invention includes a winding step of winding an electrode assembly around a winding core and a flattening step of pressing the electrode assembly wound in the winding step, in a direction orthogonal to an axial direction thereof to form a flattened shape in which the wound electrode assembly is flattened in a direction that is orthogonal to the pressing direction and the axial direction, wherein a rod-shaped spacer is inserted, in parallel to the axial direction, into the electrode assembly wound during the course of winding the electrode assembly around the winding core in the winding step, and wherein the spacer is pulled out between the winding step and the flattening step.

3 Claims, 7 Drawing Sheets

FIG. 4

| | COMPARATIVE EXAMPLE | EXAMPLE 1 | EXAMPLE 2 | EXAMPLE 3 | EXAMPLE 4 |
|---|---|---|---|---|---|
| SPACER POSITIONS X1, X2 (mm) | – | 715,768 | 557,609 | 823,877 | 715,768 |
| SPACER DIAMETER A (mm) | – | 1.5 | 1.5 | 1.5 | 2.0 |
| SHAFT CENTER DIAMETER B (mm) | 28.5 | 28.5 | 28.5 | 28.5 | 28.5 |
| WINDING THICKNESS C (mm) | 5.4 | 5.4 | 5.4 | 5.4 | 5.4 |
| THICKNESS D AFTER SPACER INSERTION (mm) | – | 6.9 | 6.9 | 6.9 | 7.4 |
| INNER THICKNESS E (mm) | – | 2.9 | 2.4 | 3.3 | 2.9 |
| SPACER POSITION RATIO E/D (%) | (100.0) | 42.0 | 34.8 | 47.8 | 39.2 |
| AMOUNT OF REBOUND AFTER PRESSING (mm) | 11.5 | 8.0 | 3.4 | 10.3 | 3.7 |
| CREASING LEVEL | 1 | 4 | 5 | 3 | 5 |

FIG. 6

| | COMPARATIVE EXAMPLE | EXAMPLE 1 | EXAMPLE 2 | EXAMPLE 3 |
|---|---|---|---|---|
| NUMBER OF SPACERS | 0 | 2 | 2 | 4 |
| SPACER POSITIONS X1, X2 (mm) | — | 2719,2794 | 2719,2794 | 1796,1864<br>3643,3724 |
| SPACER DIAMETER A (mm) | — | 1.5 | 2.0 | 1.5 |
| SHAFT CENTER DIAMETER B (mm) | 34.0 | 34.0 | 34.0 | 34.0 |
| WINDING THICKNESS C (mm) | 12.3 | 12.3 | 12.3 | 12.3 |
| THICKNESS D AFTER SPACER INSERTION (mm) | — | 13.8 | 14.3 | 15.3 |
| INNER THICKNESS E (mm) | — | 7.0 | 7.0 | 4.9<br>10.39 |
| SPACER POSITION RATIO E/D (%) | (100.0) | 50.7 | 49.0 | 32.0<br>67.9 |
| AMOUNT OF REBOUND AFTER PRESSING (mm) | 11.7 | 9.7 | 7.0 | 3.9 |
| LEVEL OF CREASING | 1 | 2 | 3 | 5 |

METHOD OF BATTERY PRODUCTION

INCORPORATION BY REFERENCE

The disclosure of Japanese Patent Application No. 2011-267093 filed on Dec. 6, 2011 including the specification, drawings and abstract is incorporated herein by reference in its entirety.

BACKGROUND OF THE INVENTION

1. Field of the Invention

The invention relates to a method for producing a battery.

2. Description of the Related Art

At the battery production processes, there is an art in which an electrode assembly is wound and then flattened by pressing, and there are documents that disclose the same (refer, for example, to Japanese Patent Application Publication No. 2010-198987 (P2010-198987 A)). In addition, there is a document that discloses an art in which, when an electrode assembly is wound, a rod-shaped spacer is inserted in parallel to the direction of the shaft center for the wound electrode assembly in order to form a space in the electrode assembly after winding (refer, for example, to Japanese Patent Application Publication No. 2003-157888 (JP2003-157888 A)).

In the ease of an electrode assembly formed as in JP2010-198987 A, the stress produced in the electrode assembly during pressing may concentrate in one region and creasing and strain may be produced in the electrode assembly as a result. When this creasing and strain remain present, the shape of the battery may occur deformation and the reduction of the battery quality, e.g., the volumetric energy density and cycle characteristics, by the expansion and contraction of the electrode assembly during charge/discharge.

On the other hand, in the case of the art according to JP2003-157888 A in which a spacer is inserted in the electrode assembly in order to form a space in the electrode assembly after winding, it has not been possible to effectively prevent the production of creasing and strain in the electrode assembly during pressing because pressing is carried out with the spacer inserted in the electrode assembly.

SUMMARY OF THE INVENTION

The invention provides a battery production method that effectively prevent the production of creasing and strain in the electrode assembly.

Aspects of the invention are described below.

Thus, an aspect of the invention is a battery production method that includes a winding step of winding an electrode assembly around a winding core and with a flattening step of pressing the electrode assembly wound in the winding step, in a direction orthogonal to an axial direction thereof to form a flattened shape in which the wound electrode assembly is flattened in a direction that is orthogonal to the pressing direction and the axial direction, wherein a rod-shaped spacer is inserted, in parallel to the axial direction, into the electrode assembly wound during the course of winding the electrode assembly around the winding core in the winding step, and wherein the spacer is pulled out from the wound electrode assembly between the winding step and the flattening step.

In the aforementioned aspect, the spacer may be positioned in the winding step on a plane that passes through the shaft center of the electrode assembly and that is perpendicular to the flattening direction.

Also in the aforementioned aspect, in the winding step one or more sets of two spacers may be disposed in a manner such that each set of two spacers is symmetrical with respect to the shaft center for the wound electrode assembly.

Also in the aforementioned aspect, the spacer may be disposed in the winding step at a location that provides an approximately equal division of the thickness of the wound electrode assembly in the radial direction.

The aforementioned aspect of the invention accomplishes the following effects.

The aforementioned aspect can prevent the battery shape from deformation and declining the battery quality, e.g., the volumetric energy density and cycle characteristics during pressing when the electrode assembly is flattened after winding, by effectively reducing the production of creasing and strain in the electrode assembly.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein:

FIG. 4 is a diagram that shows the results for the battery production method according to the first embodiment;

FIG. 6 is a diagram that shows the results for the battery production method according to a second embodiment of this invention.

DETAILED DESCRIPTION OF EMBODIMENTS

Figure 1:
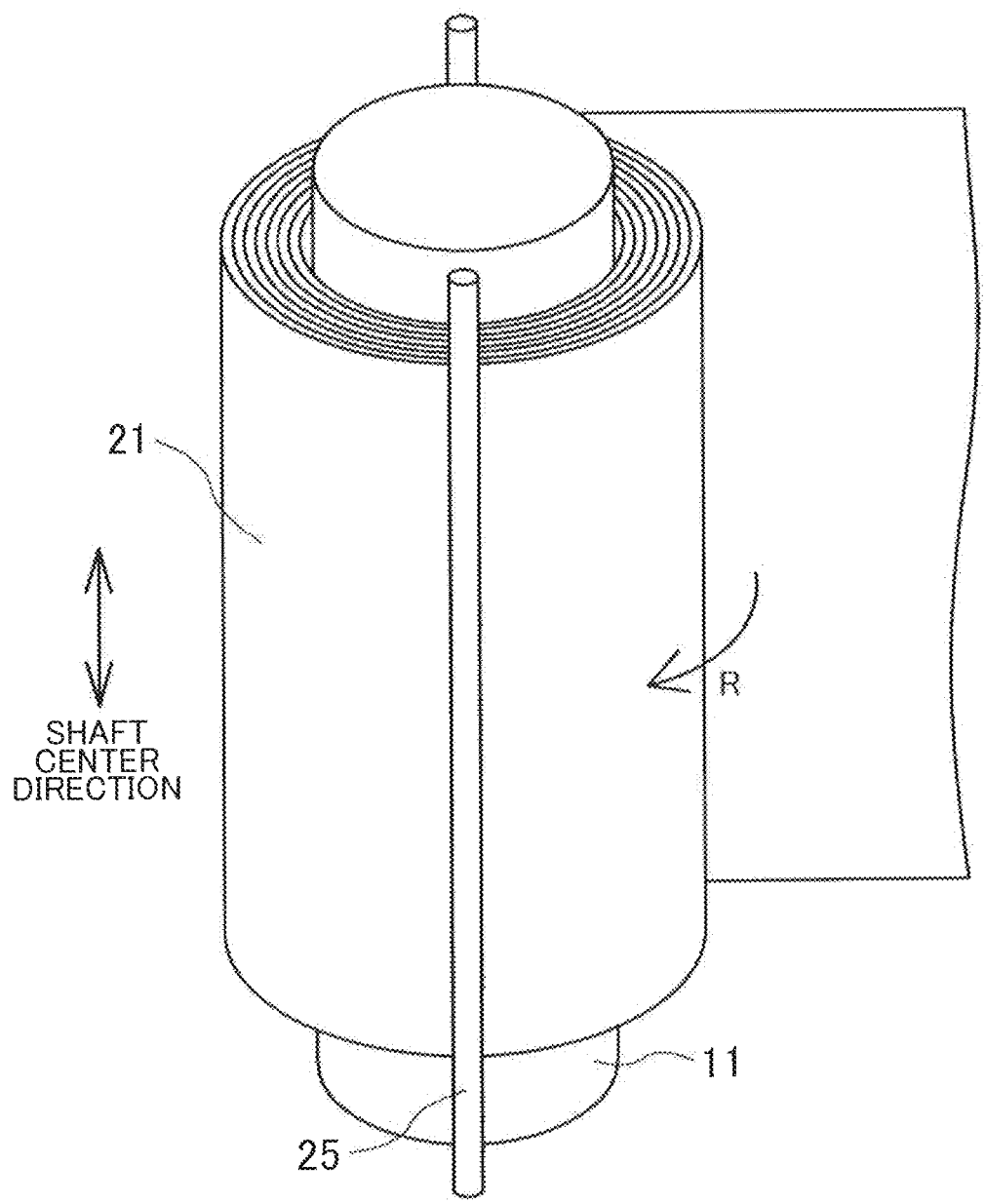
FIG. 1 is a diagram that shows a state in the winding step in which the electrode assembly is being wound according to a first embodiment of this invention.
Figure 3A:
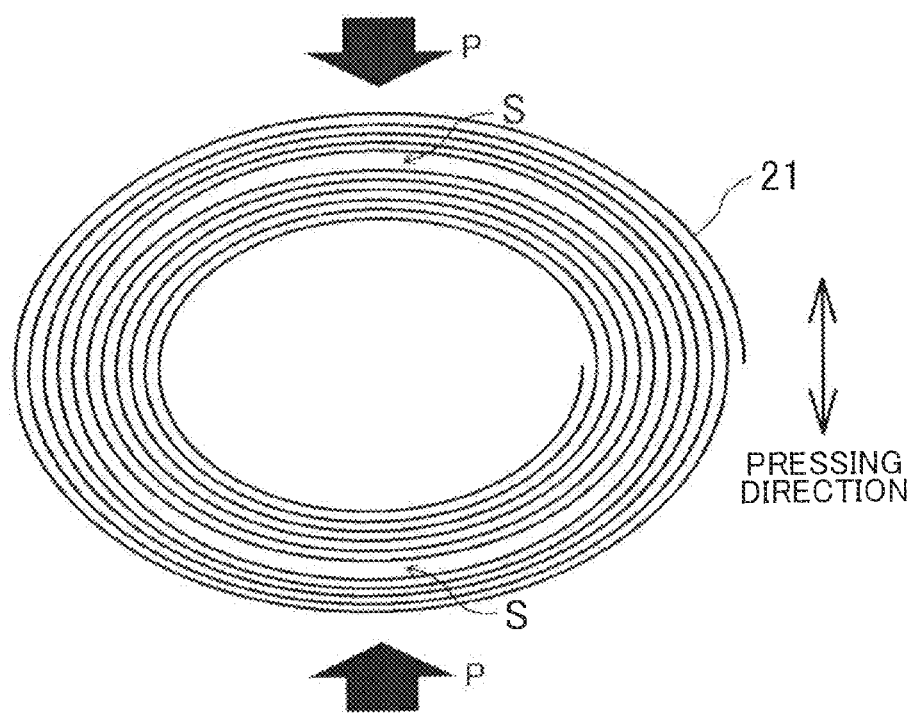
FIG. 3A is a cross-sectional diagram of a cross section, taken in the plane perpendicular to the shaft center, of the electrode assembly during pressing according to the first embodiment.
Figure 3B:
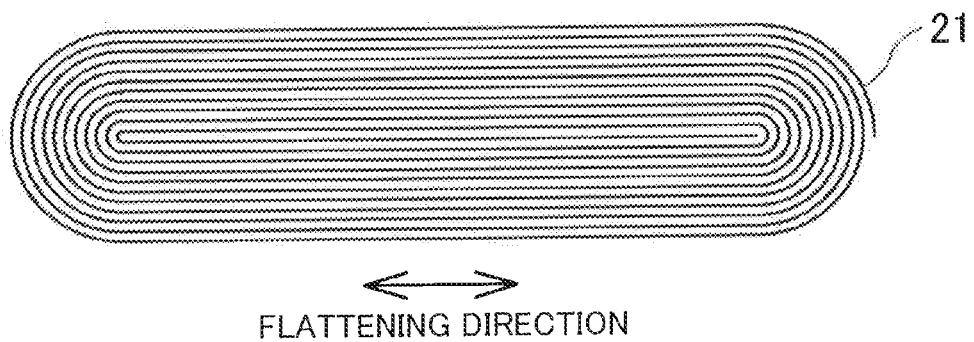
FIG. 3B is a cross-sectional diagram of a cross section, taken in the plane perpendicular to the shaft center, of the electrode assembly after pressing according to the first embodiment.

A battery production method according to a first embodiment of the invention has a winding step in which an electrode assembly 21 that will be housed in a battery case (not shown) is wound on the circumference of a winding core 11 as shown in FIG. 1 and a flattening step in which the wound electrode assembly 21 is flattened as shown in FIGS. 3A and 3B.

The electrode assembly 21 is constructed as a ribbon-shaped member by stacking a positive electrode sheet and a negative electrode sheet with a separator of a porous solid interposed therebetween. As shown by the arrow R in FIG. 1, in the winding step the electrode assembly 21 is wound a plurality of times on the circumference of a cylindrical winding core 11 to form a cylindrical winding in a manner such that the axial direction of the cylindrical winding coincides with the axial direction (the perpendicular direction shown by the arrow in FIG. 1) of the winding core 11.

A mixture containing a positive electrode active material or a negative electrode active material is supported, respectively, in the stacking region of the positive electrode sheet or the negative electrode sheet. That is, a mixture-supporting part of the positive electrode sheet and a mixture-supporting part of the negative electrode sheet are stacked on each other in the electrode assembly 21 with a separator interposed therebetween, and the electrode assembly 21 is structured to charge/discharge by a chemical reaction between the positive electrode sheet and the negative electrode sheet in the corresponding stacking region.

The positive electrode sheet in this embodiment is formed by mixing an Li(Ni—Mn—Co)O$_2$ active material, a polyvinylidene fluoride binder, and an acetylene black electroconductive material in a proportion of 89:8:3; applying this mixture on a portion of the surface of an electronically conductive aluminum foil with a thickness of 15 μm; and then processing the mixture to obtain a desired width at a thickness of 152 μm.

The negative electrode sheet in this embodiment is formed by applying a mixture that was prepared by mixing a graphite active material, a styrene-butadiene rubber (SBR) binder, and carboxymethylcellulose (CMC) functioning as a thickener in a proportion of 98:1:1 on a portion of the surface of an electronically conductive copper foil with a thickness of 10 μm and then processing the mixture to obtain a desired width at a thickness of 155 μm. In addition, a separator with a thickness of 28 μm is used. The electrode assembly 21 is structured so that the total of the thicknesses of the positive electrode sheet, negative electrode sheet, and separator per one layer is 335 μm.

Then, in the flattening step, the electrode assembly 21 that has been wound in the winding step as described above is separated from the winding core 11 (the winding core 11 is removed from the wound electrode assembly 21) and is pressed in the direction perpendicular to its axial direction (pressing direction shown by the arrow in FIG. 3A) by a pressing apparatus (not shown) in the direction of the arrow P in FIG. 3A. When this is done, the wound electrode assembly 21 (the "wound electrode assembly 21" is referred to below as the "winding" as appropriate) assumes a flattened shape in which it is flattened in the direction (the flattening direction shown by the arrow in FIG. 3B) perpendicular to the pressing direction and the axial direction.

A battery is constructed by housing the flattened winding as shown in FIG. 3B in a battery case that itself has been formed into a flattened shape that is somewhat larger than the electrode assembly 21. The battery in this embodiment is constructed so that the power generated by the winding is withdrawn from the battery case by electrically connecting a positive electrode and a negative electrode that project to the outside from the battery case with, respectively, the positive electrode sheet and the negative electrode sheet.

Figure 2A:
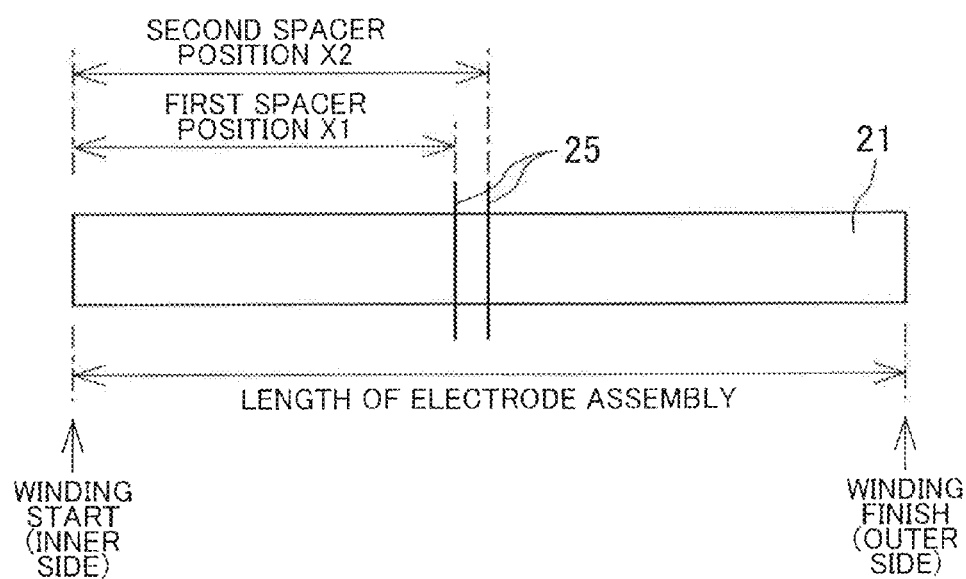
FIG. 2A is a diagram that shows the relationship between the electrode assembly before winding and the spacer insertion position according to the first embodiment.
Figure 2B:
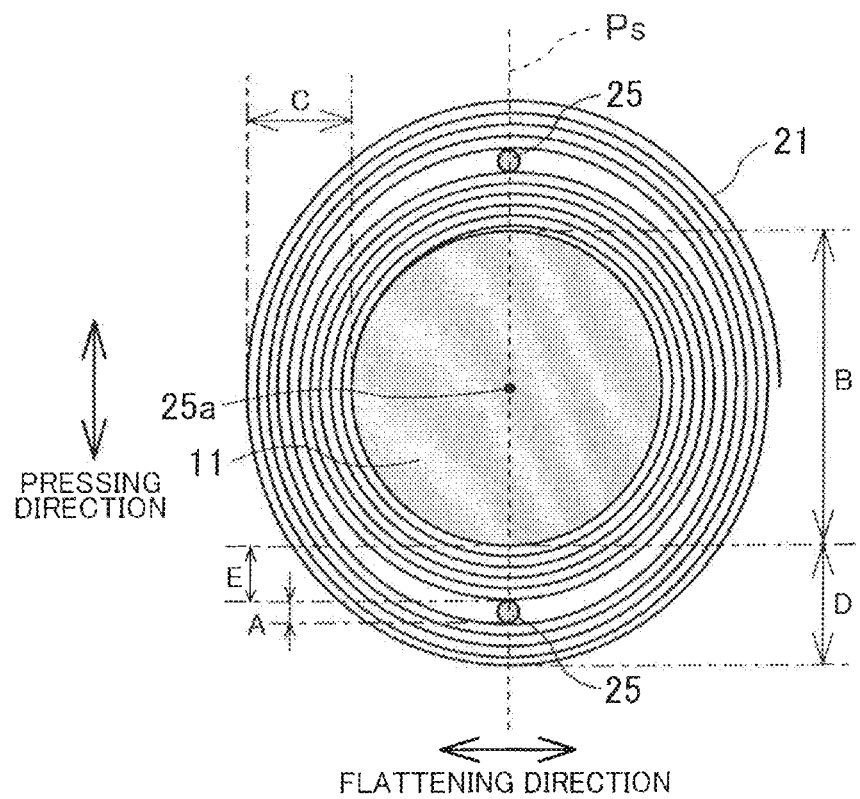
FIG. 2B is a cross-sectional diagram of a cross section, taken in the plane perpendicular to the shaft center, of the electrode assembly after winding according to the first embodiment.

In the battery production method according to this embodiment, as shown in FIGS. 1, 2A, and 2B a rod-shaped spacer 25 is inserted, during the course of winding the electrode assembly 21 on the winding core 11 in the winding step, into the electrode assembly 21 in parallel to the axial direction of the electrode assembly 21 being wound. Specifically, during the course of winding the electrode assembly 21, the spacer 25 is inserted into the electrode assembly 21 (refer to FIG. 2B) by bringing the spacer 25 into proximity to the electrode assembly 21 and thereafter continuing to carry out winding of the electrode assembly 21. As a result, each spacer 25 becomes interposed between an electrode assembly 21 and an electrode assembly 21 as they become stacked by winding. Subsequent to this, the spacer 25 is pulled out from the winding provided by winding the electrode assembly 21 and the electrode assembly 21 is then pressed in the flattening step (refer to FIG. 3).

In the battery production method according to this embodiment, when the spacer 25 is pulled out from the winding, a space S is produced within the electrode assembly 21 in the region where the spacer 25 was inserted in the winding, as shown in FIG. 3A. This makes it possible to disperse the stresses generated in the electrode assembly 21 when the winding is pressed in the flattening step. Thus, the generation of creasing and strain in the electrode assembly 21 can be prevented by preventing the stresses on the electrode assembly 21 of the winding from concentrating in one region. By preventing this creasing and strain, deformation in the battery shape and a decline in battery quality, e.g., the volumetric energy density and cycle characteristics, can be inhibited even when the electrode assembly 21 undergoes expansion and contraction during charge/discharge.

As described above, the battery production method according to this embodiment effectively reduces the generation of creasing and strain in the electrode assembly 21 during pressing when the electrode assembly 21 is flattened after it has been wound to form a winding. This makes it possible to prevent the battery shape from deforming and declining the battery quality, e.g., the volumetric energy density and cycle characteristics.

Incidentally, the generation of unnecessary space must be avoided when the winding is flattened by pressing as described above. The diameter of the spacer 25 is preferably set to a suitable size as a consequence.

In addition, in the battery production method according to this embodiment, the spacer 25 is positioned in the winding step on a plane Ps that passes through the shaft center 25a of the electrode assembly 21 being wound and that is perpendicular to the flattening direction, as shown in FIG. 2B. The space S produced within the electrode assembly 21 of the winding is thus uniformly dispersed in the flattening direction (the left-to-right direction in FIG. 3B) by pressing the winding in the flattening step.

Since, as a result, the stresses produced in the electrode assembly 21 can he uniformly dispersed in the flattening direction, the production of creasing and strain in the electrode assembly 21 can he effectively prevented.

Also in the battery production method according to this embodiment, a set of (two) spacers 25 is positioned in the winding step symmetrically relative to the shaft center 25a of the electrode assembly 21 being wound, i.e., so as to provide approximately equal distances from the shaft center 25a.

Since, as a result, the stresses produced in the electrode assembly 21 of the winding can be equally dispersed in the pressing direction that sandwiches the shaft center 25a (the perpendicular direction in FIG. 3A), the production of creasing and strain in the electrode assembly 21 can be effectively prevented. While this embodiment has a structure in which a single set of spacers 25 is positioned, a structure may also be used in which two sets (four spacers) or more of spacers are positioned.

Also in the battery production method according to this embodiment, the spacer 25 is positioned in the winding step at a location that provides an approximately equal division of the thickness C (the width C shown in FIG. 2B) of the winding in the radial direction of the winding. That is, the spacer 25 is positioned in the winding so that the inner thickness E (the width E shown in FIG. 2B) on the inner side from the spacer 25 is approximately the same as the thickness of the outer side from the spacer 25.

Since, as a result, the stresses produced on one side within the electrode assembly 21 of the winding can be equally dispersed in the radial direction that sandwiches the spacer 25 (the up-and-down direction in FIG. 3), the production of creasing and strain in the electrode assembly 21 can be effectively prevented. In this embodiment, a set of spacers 25 is positioned at locations that equally divide the thickness C of the winding in the radial direction of the winding; meanwhile, when, for example, two sets of spacers (four spacers) are provided, the spacers may be disposed at locations that trisect the thickness C of the winding in the radial direction of the winding.

The results of comparison testing carried out using different spacer 25 positioning configurations in the battery production method according to this embodiment are described below using FIGS. 4 and 5. In this comparison testing, the length of the positive electrode sheet in a winding structured as described above was 1490 mm; the diameter B of the shaft center of the winding core 11 (the width B shown in FIG. 2B) was 28.5 mm; and the thickness C of the winding in the radial direction of the winding was 5.4 mm.

In addition, showing A as the diameter of the spacer 25 (the width A shown in FIG. 2B), D as the thickness of the winding in the radial direction of the winding after the insertion of the spacer 25 (the width D shown in FIG. 2B), E as the inner thickness of the winding to the inside of the spacer 25, X1 as the position of the first spacer in the length direction from the winding start (inner side) for the electrode assembly 21, and X2 as the position of the second spacer in the length direction from the winding start for the electrode assembly 21 (the widths X1 and X2 in FIG. 2A), windings were prepared as Examples 1 to 4 using different numerical values for the preceding as shown in FIG. 4. In the Comparative example, the same testing was carried out on a winding prepared by winding the electrode assembly without inserting a spacer 25.

In the practical testing, 800 kgf was used for the pressing load in the flattening step, and pressing was performed by holding for 10 seconds in a state in which the particular winding had a thickness of 10.5 mm.

Figure 5A:
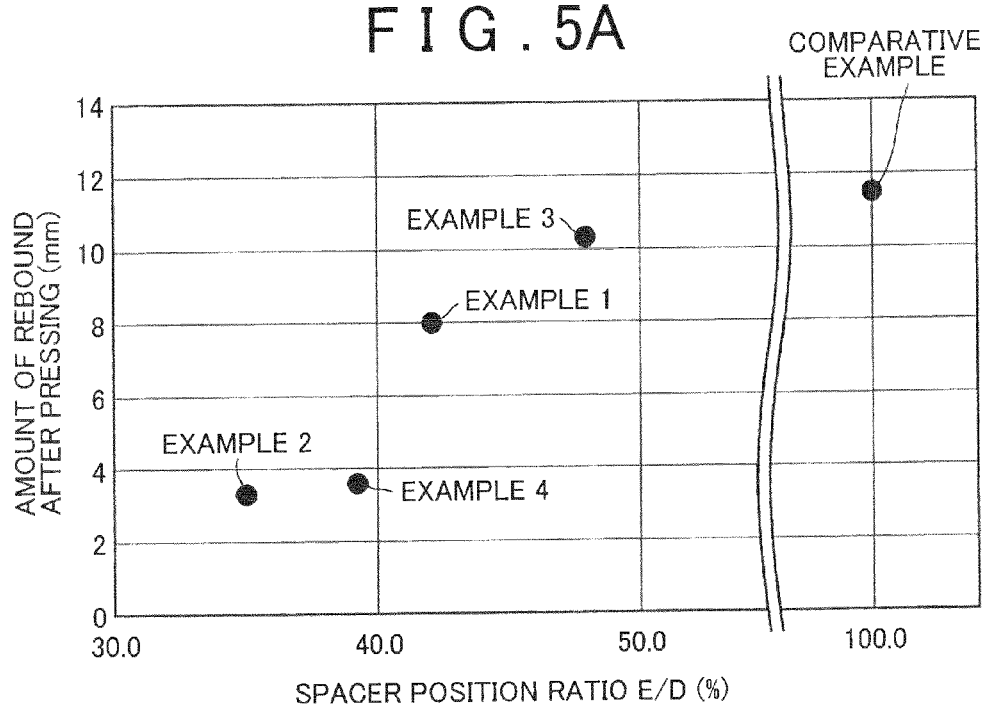
FIGS. 5A and 5B show, respectively, the amount of rebound after pressing and the creasing level for the battery production method according to the first embodiment.

FIG. 5A gives the test results for the relationship between the spacer position ratio E/D and the pressing amount of rebound for the winding in the Comparative example, which lacked spacers, and for the windings of Examples 1 to 4. The spacer position ratio E/D is the ratio of the inner thickness E on the inside from the spacer 25, to the thickness D of the winding after insertion of the spacers 25. The spacer position ratio E/D for the winding of the spacer-free Comparative example is defined as 100%. The pressing amount of rebound is the numerical value measured for how much the thickness had increased (rebounded) when the thickness of the winding was measured 5 minutes after the winding had been pressed in the flattening step.

As shown in FIG. 5A, all of the windings in Examples 1 to 4 of the battery production method according to this embodiment were able to provide a smaller pressing amount of rebound than the winding in the spacer-free Comparative example. In particular, an even smaller amount of rebound after pressing could be obtained in Example 2, in which the first and second spacer positions X1 and X2 were small and the spacers 25 were positioned more inward than in the other examples. In addition, Example 4, in which 2.0 was used for the spacer diameter A, could provide a smaller amount of rebound after pressing than Example 1, in which 1.5 was used for the spacer diameter A.

Figure 5B:
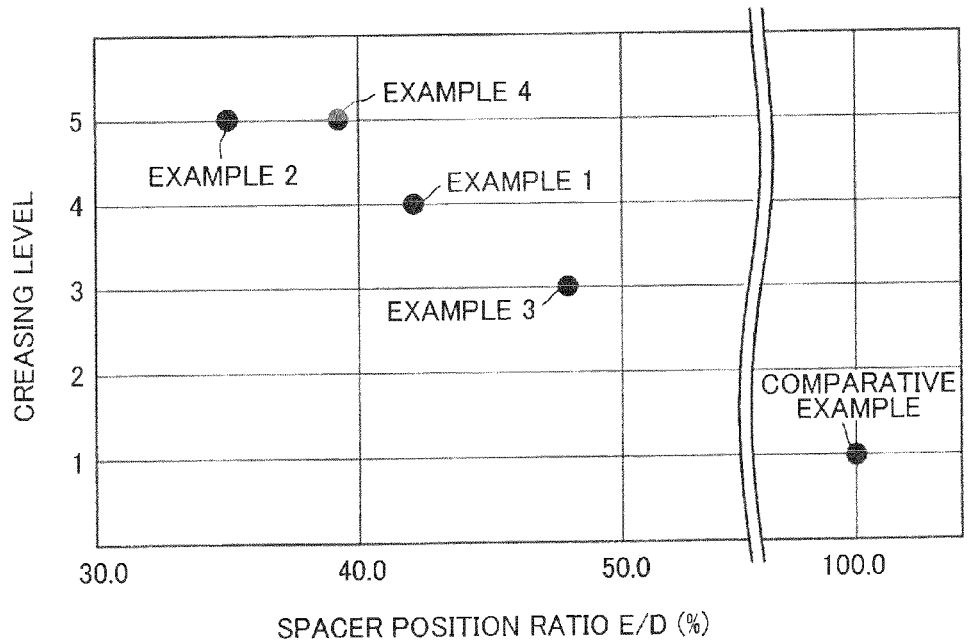

FIG. 5B gives the test results for the relationship between the spacer position ratio E/D and the creasing level for the winding in the Comparative example, which lacked spacers, and for the windings of Examples 1 to 4. For the creasing level, the creasing produced in the electrode assembly 21 of the winding after the winding had been pressed in the flattening step was visually scored on a multilevel scale.

Specifically, a level of 1 is assigned when creasing can be visually observed and the core material (aluminum foil or copper foil) of the positive electrode sheet or negative electrode sheet is folded in a Z-shape. A level of 2 is assigned when creasing can be visually observed and the core material of the positive electrode sheet or negative electrode sheet is folded in a V-shape. A level of 3 is assigned when creasing can be visually observed and the core material of the positive electrode sheet or negative electrode sheet, while not folded, has a U-shaped curvature. A level of 4 is assigned when creasing can be visually observed under illumination with a light. A level of 5 is assigned when creasing cannot be visually observed.

As shown in FIG. 5B, all of the windings in Examples 1 to 4 of the battery production method according to this embodiment were able to provide a better creasing level (a larger numerical value) than the winding in the spacer-free Comparative example. In particular, a better creasing level than in the other examples could be obtained in Example 2, in which the first and second spacer positions X1 and X2 were small and the spacers 25 were positioned more inward than in the other examples, and in Example 4, in which 2.0 was used for the spacer diameter A.

The results of comparison testing carried out using different spacer 25 positioning configurations in the battery production method according to a second embodiment are described below using FIGS. 6 and 7. In this comparison testing, a winding structured as in the first embodiment had the length of the positive electrode sheet set to 5470 mm, the diameter B of the shaft center of the winding core 11 set to 34.0 mm, and the thickness C of the winding in the radial direction of the winding set at 12.3 mm.

The positive electrode sheet used in this embodiment has a thickness of 126 μm; the negative electrode sheet has a thickness of 131 μm; and the separator has a thickness of 26 μm. The electrode assembly 21 is constructed to have a total for the thicknesses of the positive electrode sheet, negative electrode sheet, and separator of 183 μm per one layer.

In addition, showing A as the diameter of the spacer D as the thickness of the winding in the radial direction of the winding after the insertion of the spacer 25, E as the inner thickness of the winding to the inside of the spacer 25, X1 as the position of the first spacer from the winding start (inner side) for the electrode assembly 21, and X2 as the position of the second spacer from the winding start for the electrode assembly 21, windings were prepared as Examples 1 to 3 using different numerical values for the preceding as shown in FIG. 6. In the Comparative example, the same testing was carried out on a winding in which a spacer 25 was not inserted. In addition, testing was carried out in Example 3 with the disposition of two pairs of spacers 25 (four spacers).

In the comparison testing, 1000 kgf was used for the pressing load in the flattening step, and pressing was performed by holding for 10 seconds in a state in which the particular winding had a thickness of 24.5 mm.

Figure 7A:
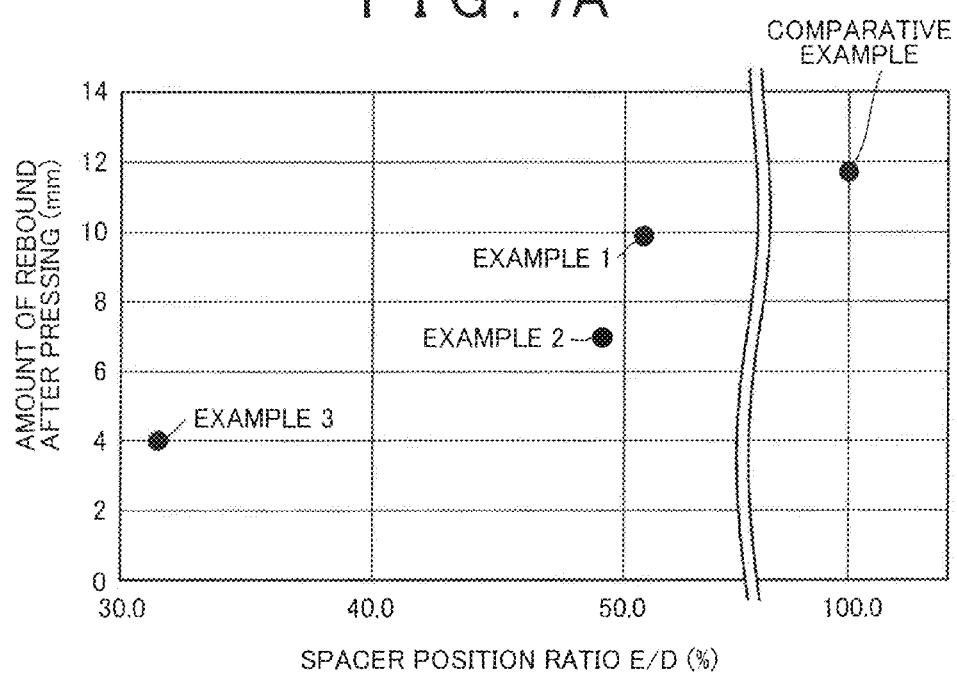
FIGS. 7A and 7B show, respectively the amount of rebound after pressing and the creasing level for the battery production method according to the second embodiment.

FIG. 7A gives the test results for the relationship between the spacer position ratio RD and the pressing amount of rebound for the spacer-free winding and for the windings of Examples 1 to 3 and the Comparative example. As shown in FIG. 7A, all of the windings in Examples 1 to 3 of the battery production method according to this embodiment were able to provide a smaller pressing amount of rebound than the winding in the spacer-free Comparative example. In particular, an even smaller amount of rebound after pressing could be obtained in Example 3, in which two pairs of spacers 25 (four spacers) were disposed, than in the other examples.

Figure 7B:
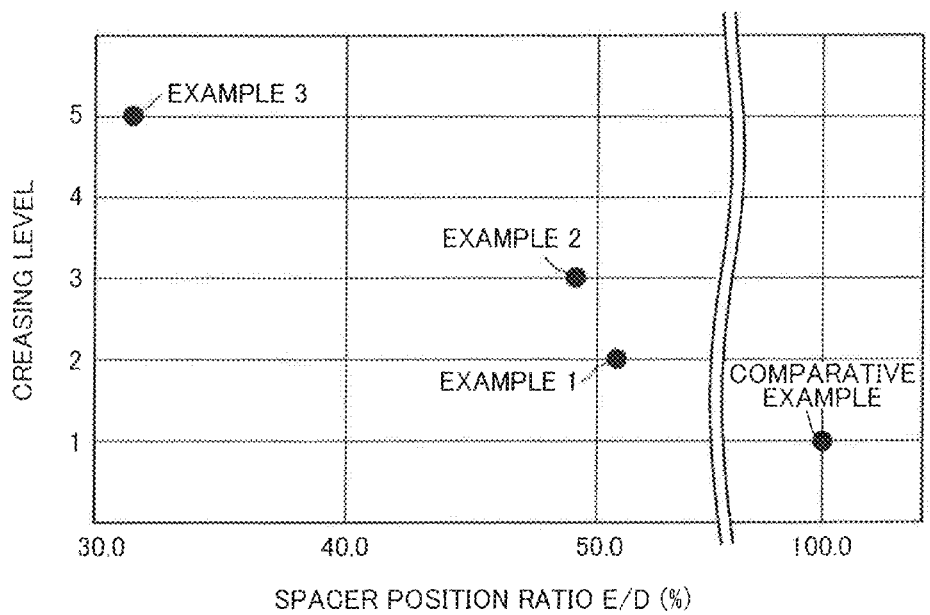

FIG. 7B gives the test results for the relationship between the spacer position ratio B/D and the creasing level for the winding in the Comparative example, which lacked spacers, and for the windings of Examples 1 to 3. The creasing levels are the same as described above for the first embodiment.

As shown in FIG. 7B, all of the windings in Examples 1 to 3 of the battery production method according to this second embodiment were able to provide a better creasing level (a larger numerical value) than the winding in the spacer-free Comparative example. In particular, a better creasing level than in the other examples could be obtained in Example 3, in which two pairs of spacers 25 (four spacers) were disposed.

As has been described in the preceding, the practical testing for the battery production method according to the first and second embodiments demonstrated that the generation of creasing and strain in the electrode assembly 21 could be effectively lowered by dispersing the stresses generated in the electrode assembly 21 of the winding during pressing and thereby preventing the stresses in the electrode assembly 21 from concentrating in one region.

What is claimed is:

1. A method of producing a battery, comprising:
   a winding step of winding an electrode assembly around the circumference of a winding core; and
   a flattening step of pressing the electrode assembly wound in the winding step, in a direction orthogonal to an axial direction thereof to form a flattened shape in which the wound electrode assembly is flattened in a direction that is orthogonal to the pressing direction and the axial direction, wherein:
      at least one rod-shaped spacer is inserted, in parallel to the axial direction, into the electrode assembly wound during the course of winding the electrode assembly around the winding core in the winding step, and the spacer is pulled out from the wound electrode assembly between the winding step and the flattening step; and
      the at least one spacer is positioned in the winding step on a plane that passes through the shaft center of the electrode assembly and that is perpendicular to the flattening direction.

2. A method of producing a battery, comprising:
   a winding step of winding an electrode assembly around the circumference of a winding core; and
   a flattening step of pressing the electrode assembly wound in the winding step, in a direction orthogonal to an axial direction thereof to form a flattened shape in which the wound electrode assembly is flattened in a direction that is orthogonal to the pressing direction and the axial direction, wherein:
      at least one rod-shaped spacer is inserted, in parallel to the axial direction, into the electrode assembly wound during the course of winding the electrode assembly around the winding core in the winding step, and the spacer is pulled out from the wound electrode assembly between the winding step and the flattening step; and
      in the winding step one or more sets of two spacers are disposed in a manner such that each set of two spacers is symmetrical with respect to the shaft center for the wound electrode assembly.

3. A method of producing a battery, comprising:
   a winding step of winding an electrode assembly around the circumference of a winding core; and
   a flattening step of pressing the electrode assembly wound in the winding step, in a direction orthogonal to an axial direction thereof to form a flattened shape in which the wound electrode assembly is flattened in a direction that is orthogonal to the pressing direction and the axial direction, wherein:
      at least one rod-shaped spacer is inserted, in parallel to the axial direction, into the electrode assembly wound during the course of winding the electrode assembly around the winding core in the winding step, and the spacer is pulled out from the wound electrode assembly between the winding step and the flattening step; and
      the at least one spacer is disposed in the winding step at a location that provides an approximately equal division of the thickness of the wound electrode assembly in the radial direction.

\* \* \* \* \*